Figure 1:
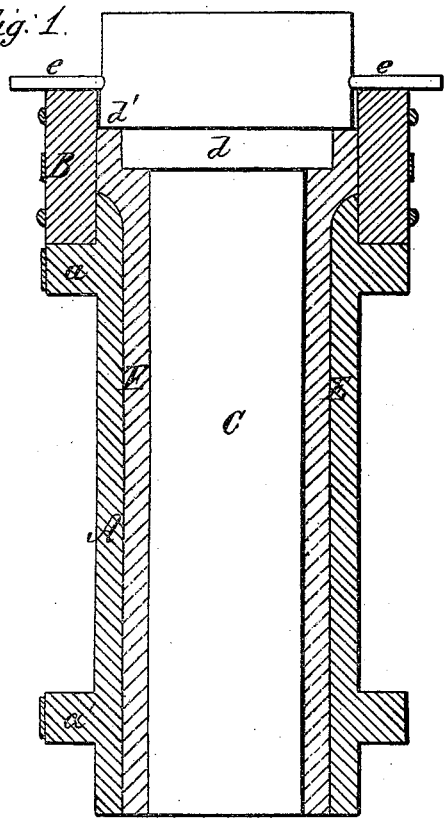
Figure 2:
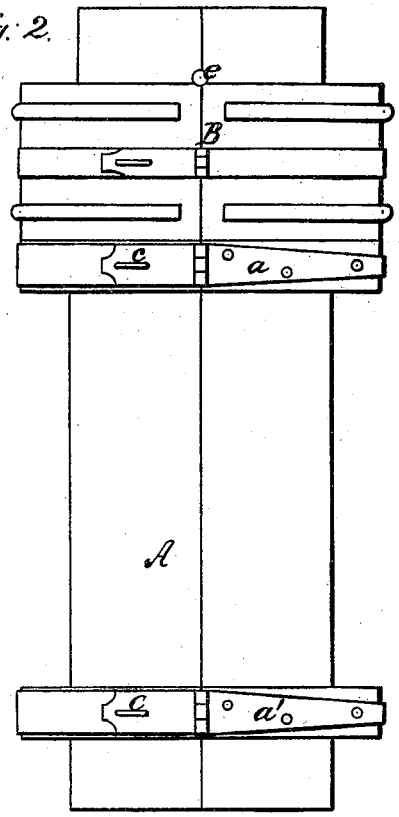
Figure 3:
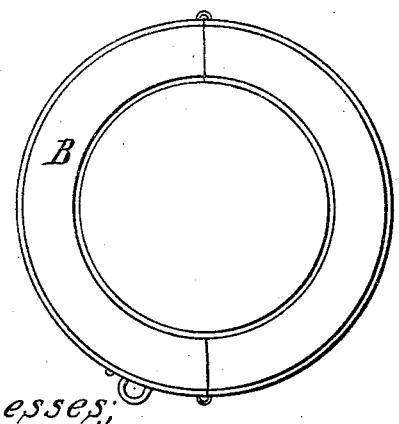
Figure 4:
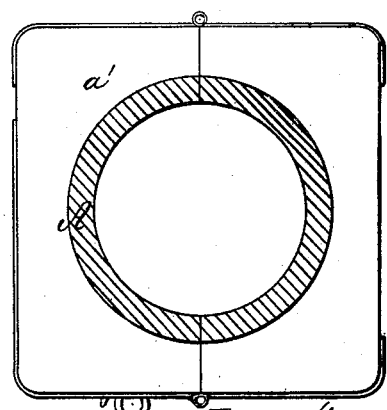

J. Lyth.

Making Sewer Pipe.

Nº 96,021.     Patented Oct. 19, 1869.

Witnesses:
W. H. Forbush
Jno. H. Bonner

Inventor:
John Lyth

United States Patent Office.

JOHN LYTH, OF BUFFALO, NEW YORK.

Letters Patent No. 96,021, dated October 19, 1869.

IMPROVEMENT IN MANUFACTURE OF SEWER-PIPE.

The Schedule referred to in these Letters Patent and making part of the same.

*To all whom it may concern:*

Be it known that I, JOHN LYTH, of the city of Buffalo, in the county of Erie, and State of New York, have invented a certain new and useful Improvement in the Manufacture of Sewer-Pipes; and I do hereby declare that the following is a full, clear, and exact description thereof, reference being had to the accompanying drawings, making part of this specification.

My invention relates to the forming of the socket at the end of the pipe, which operation has heretofore involved a considerable amount of skilled labor, in order to produce a durable article; and it is the object of my invention to dispense with manual labor in forming the socket of a clay sewer-pipe, and furnish a cheaper and more efficient mode of manufacturing the same.

In order to have the merits of my invention clearly understood, I must explain the present state of the art.

A manner of forming sockets on terra-cotta pipes, very frequently used, is the following:

The pipe, finished, with the exception of the socket, is rotated on a common potter's wheel, and a sufficient quantity of clay to form the socket is put on top of it. An inside former, of the required shape, is then put into the end of the pipe, and the interior of the socket formed, when an outside former is held against the end of the pipe, and thereby the exterior of the socket is formed.

It is evident that this manner of forming the socket requires two distinct manipulations, and that the operation of the formers must be controlled by a skilled workman.

Another way of forming the socket is the following:

The pipe is put into a mould having the shape of a pipe, with a socket on one end, and the end of the pipe at which the socket is to be formed is bent outward, so that it will acquire the shape of the mould. An inside former is then put into the end of the pipe, and the interior of the socket formed.

This stretching of the end of the pipe to the increased size of the socket weakens the cohesion among its particles, and reduces the thickness at the bend to such an extent as to render the socket extremely liable to break off while drying, or in handling and transporting the pipe.

Another old and well-known practice is to attach rings to the ends of sewer-pipes, by means of a paste of wet clay, in order to form a socket thereon. This operation is executed in precisely the same way as handles are attached to clay vessels, but is not well adapted to the purpose, by reason of lack of durability in the joint of socket and pipe.

I will now proceed to describe my improved mode of forming sockets on sewer-pipes.

The nature of my invention consists in forming the socket, and welding the same to the pipe-body, at one operation, by pressure in a mould of the required contour, the pressure-follower or former having a shank fitting the bore of the pipe, to secure the pipe against collapsing under said pressure, and an enlarged end and shoulder, to form the socket.

In the accompanying drawings—

Figure I is a vertical section of pipe-mould.

Figure II is an outside view of same.

Figure III is a top plan view of collar forming the mould of socket.

Figure IV is a horizontal section of mould on line *x x*.

Like letters refer to like parts in each of the figures.

A is the mould of the pipe proper, having the exact dimensions of a section of pipe.

It is provided, near the top and bottom, with flanges $a$ $a'$, which serve to stiffen the same, as clearly shown in Figs. I and IV.

This mould is cut into halves, and said halves being hinged at $b$, they can be swung apart, so as to allow of an easy insertion of the pipe.

A fastening-device, $c$, will keep the two halves firmly closed when the pipe is under operation.

B is a cylindrical collar, which rests on flange $a$, and forms the mould of the socket. It is cut into halves, hinged and operated in the same manner as the mould of the pipe proper, and is only made detached from the latter for greater convenience.

C is the follower or inside former. It consists of a cylindrical part, coated with sheet-metal, which fits into the bore of the pipe, and an extension or enlarged portion, $d$, near the top, which shapes the interior. A second enlargement, $d'$, faces the end of the socket. This portion $d'$ is made a little smaller in diameter than the collar B, to allow the air to escape when the follower is moving downward. Stops $e$ are provided, to regulate the distance to which the follower can be forced into the pipe.

E is the pipe, filling the space between the follower and the mould.

The operation is as follows:

The pipe, which is formed in any common machine, is taken in a semi-plastic state, so that it may be handled with safety, and at the same time be sufficiently soft to allow fresh clay to unite with it, and is inserted into the mould A, and the two halves firmly closed, and the collar B is put on.

The collar B is then lined with a quantity of fresh clay, sufficient to form the socket, this fresh clay meeting the end of the pipe which reaches to the upper edge of the mould A, or nearly so.

Then the follower C is inserted into the pipe, and the pressure of a suitable press is applied to the top of the follower, whereby the same is forced down, and the fresh clay caused to firmly unite with the pipe under pressure, being formed at the same time into the required shape of the socket by the enlarged portions $d$ and $d'$ of the follower.

The stops $e$ prevent the follower from going down too far, and also form handles by which the follower is withdrawn from the completed pipe. The cylindrical part of the follower keeps the pipe in shape, and prevents it from bending or collapsing under the pressure.

The addition of clay to the end of the pipe enables the socket to be made of equal thickness with the pipe, and the bend or point most liable to be broken to be made of greater thickness, while the upper flange $d'$ of the follower, in connection therewith, operates to upset and form the end of the socket, as well as to increase the cohesion of the clay, by pressing it more compactly together.

It is manifest, from this description, that the operation of forming the socket is effected by a single movement of the follower; that the use of skilled manual labor is entirely dispensed with; and that a most perfect and durable union of socket and pipe is produced, by virtue of the pressure which is employed in forming the same, the result of which is a cheaper and more durable article than has been produced heretofore, all the objections to the modes of forming sockets on sewer-pipes now generally in use being effectually remedied.

What I claim as my invention, and desire to secure by Letters Patent, is—

Forming and welding a socket to an already-formed clay pipe, by applying a quantity of clay, and then subjecting it, within a mould, A B, to the pressure of the follower C, provided with flanges $d$ and $d'$, substantially in the manner and for the purposes hereinbefore set forth.

JOHN LYTH.

Witnesses:
  W. H. FORBUSH,
  JNO. J. BONNER.